(12) United States Patent
Holecek et al.

(10) Patent No.: US 8,341,541 B2
(45) Date of Patent: Dec. 25, 2012

(54) SYSTEM AND METHOD FOR VISUALLY BROWSING OF OPEN WINDOWS

(75) Inventors: Ales Holecek, Bellevue, WA (US); Charles W. Stabb, Seattle, WA (US); Hillel N. Cooperman, Sammamish, WA (US); Jeffrey W. Pettiross, Seattle, WA (US); Mark R. Ligameri, Snohomish, WA (US); Kanwal VedBrat, Seattle, WA (US); Donald J. Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 11/036,611

(22) Filed: Jan. 18, 2005

(65) Prior Publication Data

US 2006/0161861 A1 Jul. 20, 2006

(51) Int. Cl.
*G06F 3/048* (2006.01)

(52) U.S. Cl. ........ 715/782; 715/757; 715/759; 715/766; 715/767; 715/781; 715/790; 715/793; 715/794; 715/796; 715/800; 715/802; 715/836; 715/852

(58) Field of Classification Search ................. 715/766, 715/782, 757, 759, 790, 800, 802, 794, 836, 715/852, 781, 793, 796, 767
See application file for complete search history.

(56) References Cited

U.S. PATENT DOCUMENTS

| | | | |
|---|---|---|---|
| 4,651,146 A | 3/1987 | Lucash et al. | |
| 4,653,020 A | 3/1987 | Cheselka et al. | |
| 4,862,389 A | 8/1989 | Takagi | |
| 5,412,776 A | 5/1995 | Bloomfield | |
| 5,463,726 A | 10/1995 | Price | |
| 5,499,334 A | 3/1996 | Staab | |
| 5,515,494 A * | 5/1996 | Lentz | 715/797 |
| 5,546,528 A | 8/1996 | Johnston | |
| 5,651,107 A | 7/1997 | Frank et al. | |
| 5,668,962 A | 9/1997 | Kitami | |
| 5,754,809 A * | 5/1998 | Gandre | 715/782 |
| 5,758,110 A | 5/1998 | Boss et al. | |
| 5,841,435 A | 11/1998 | Dauerer et al. | |
| 5,874,960 A | 2/1999 | Mairs et al. | |
| 5,880,733 A * | 3/1999 | Horvitz et al. | 715/850 |
| 5,889,517 A | 3/1999 | Ueda | |
| 5,892,511 A * | 4/1999 | Gelsinger et al. | 715/794 |
| 5,898,433 A * | 4/1999 | Hijikata | 715/782 |
| 5,920,316 A | 7/1999 | Oran et al. | |
| 5,929,854 A * | 7/1999 | Ross | 715/783 |

(Continued)

OTHER PUBLICATIONS

The TaskGallery, http://research.microsoft.com/ui/TaskGallery.

(Continued)

*Primary Examiner* — Doon Chow
*Assistant Examiner* — Linh K Pham
(74) *Attorney, Agent, or Firm* — Shook, Hardy & Bacon LLP

(57) ABSTRACT

A method referred to as visual window browsing allows a user to browse through windows on their desktop. Aspects of the invention include responsive to a command, moving open windows to form a visual stack with the topmost window in the stack being in focus. Responsive to a browse the windows in the visual stack can be browsed, where the topmost window moves to the bottom of the visual stack and the other windows move higher in the stack, with the second highest window becoming the topmost window and being in focus. Successive browse commands causes this behavior to repeat allowing a user to cycle through each of the open windows.

20 Claims, 12 Drawing Sheets

U.S. PATENT DOCUMENTS

| | | | | |
|---|---|---|---|---|
| 5,949,432 | A | 9/1999 | Gough et al. | |
| 6,008,809 | A | 12/1999 | Brooks | |
| 6,031,530 | A * | 2/2000 | Trueblood | 715/791 |
| 6,040,833 | A * | 3/2000 | Henshaw | 715/794 |
| 6,043,818 | A * | 3/2000 | Nakano et al. | 715/851 |
| 6,072,488 | A * | 6/2000 | McFarland | 715/799 |
| 6,075,531 | A * | 6/2000 | DeStefano | 715/788 |
| 6,108,714 | A | 8/2000 | Kumagai et al. | |
| 6,160,554 | A | 12/2000 | Krause | |
| 6,166,736 | A | 12/2000 | Hugh | |
| 6,184,883 | B1 * | 2/2001 | Bates et al. | 715/794 |
| 6,215,490 | B1 * | 4/2001 | Kaply | 715/788 |
| 6,229,542 | B1 * | 5/2001 | Miller | 715/782 |
| 6,239,798 | B1 | 5/2001 | Ludolph et al. | |
| 6,272,484 | B1 | 8/2001 | Martin et al. | |
| 6,275,227 | B1 * | 8/2001 | DeStefano | 369/30.01 |
| 6,313,855 | B1 * | 11/2001 | Shuping et al. | 715/854 |
| 6,321,209 | B1 | 11/2001 | Pasquali | |
| 6,344,863 | B1 * | 2/2002 | Capelli et al. | 715/781 |
| 6,411,292 | B1 * | 6/2002 | Cook et al. | 345/419 |
| 6,429,855 | B2 | 8/2002 | Pabon | |
| 6,429,883 | B1 | 8/2002 | Plow et al. | |
| 6,486,895 | B1 * | 11/2002 | Robertson et al. | 715/776 |
| 6,549,218 | B1 | 4/2003 | Gershony et al. | |
| 6,577,330 | B1 * | 6/2003 | Tsuda et al. | 715/782 |
| 6,590,593 | B1 * | 7/2003 | Robertson et al. | 715/782 |
| 6,590,594 | B2 | 7/2003 | Bates et al. | |
| 6,597,358 | B2 * | 7/2003 | Miller | 345/427 |
| 6,628,310 | B1 * | 9/2003 | Hiura et al. | 715/776 |
| 6,636,246 | B1 * | 10/2003 | Gallo et al. | 715/805 |
| 6,686,938 | B1 | 2/2004 | Jobs et al. | |
| 6,710,788 | B1 * | 3/2004 | Freach et al. | 715/778 |
| 6,720,982 | B1 | 4/2004 | Sakaguchi | |
| 6,734,873 | B1 | 5/2004 | Herf et al. | |
| 6,781,611 | B1 | 8/2004 | Richard | |
| 6,822,662 | B1 * | 11/2004 | Cook et al. | 715/788 |
| 6,874,123 | B1 * | 3/2005 | DeStefano | 715/234 |
| 6,915,489 | B2 * | 7/2005 | Gargi | 715/790 |
| 6,922,815 | B2 * | 7/2005 | Rosen | 715/782 |
| 6,957,395 | B1 | 10/2005 | Jobs et al. | |
| 6,988,135 | B2 | 1/2006 | Martin et al. | |
| 6,996,783 | B2 * | 2/2006 | Brown et al. | 715/790 |
| 7,028,264 | B2 | 4/2006 | Santoro et al. | |
| 7,047,500 | B2 | 5/2006 | Roelofs | |
| 7,069,518 | B2 * | 6/2006 | Card et al. | 715/776 |
| 7,103,850 | B1 * | 9/2006 | Engstrom et al. | 715/778 |
| 7,119,819 | B1 * | 10/2006 | Robertson et al. | 715/782 |
| 7,146,573 | B2 * | 12/2006 | Brown et al. | 715/802 |
| 7,159,189 | B2 * | 1/2007 | Weingart et al. | 715/799 |
| RE39,610 | E * | 5/2007 | McFarland | 715/794 |
| 7,250,955 | B1 | 7/2007 | Beeman et al. | |
| 7,296,242 | B2 * | 11/2007 | Agata et al. | 715/793 |
| 7,386,801 | B1 * | 6/2008 | Horvitz et al. | 715/764 |
| 7,426,697 | B2 | 9/2008 | Holecek | |
| 7,439,975 | B2 * | 10/2008 | Hsu | 345/426 |
| 7,478,326 | B2 | 1/2009 | Holecek | |
| 7,506,267 | B2 * | 3/2009 | Baxter et al. | 715/781 |
| 7,519,907 | B2 * | 4/2009 | Cohen et al. | 715/723 |
| 7,552,397 | B2 | 6/2009 | Holecek | |
| RE41,113 | E * | 2/2010 | McFarland | 715/794 |
| 7,747,965 | B2 | 6/2010 | Holecek | |
| 2001/0028368 | A1 | 10/2001 | Swartz et al. | |
| 2001/0035882 | A1 | 11/2001 | Stoakley et al. | |
| 2002/0091739 | A1 * | 7/2002 | Ferlitsch et al. | 707/526 |
| 2002/0130904 | A1 | 9/2002 | Becker et al. | |
| 2002/0171682 | A1 | 11/2002 | Frank et al. | |
| 2003/0117440 | A1 * | 6/2003 | Hellyar et al. | 345/767 |
| 2003/0142108 | A1 | 7/2003 | Brown et al. | |
| 2003/0142109 | A1 | 7/2003 | Brown et al. | |
| 2003/0142136 | A1 * | 7/2003 | Carter et al. | 345/782 |
| 2003/0142138 | A1 * | 7/2003 | Brown et al. | 345/797 |
| 2003/0142140 | A1 | 7/2003 | Brown et al. | |
| 2003/0164862 | A1 | 9/2003 | Cadiz et al. | |
| 2003/0179237 | A1 * | 9/2003 | Nelson et al. | 345/765 |
| 2003/0210270 | A1 | 11/2003 | Clow et al. | |
| 2004/0004632 | A1 * | 1/2004 | Knight et al. | 345/711 |
| 2004/0066408 | A1 | 4/2004 | Meyers et al. | |
| 2004/0174396 | A1 | 9/2004 | Jobs et al. | |
| 2004/0212640 | A1 | 10/2004 | Mann et al. | |
| 2004/0255254 | A1 * | 12/2004 | Weingart et al. | 715/804 |
| 2004/0261038 | A1 * | 12/2004 | Ording et al. | 715/792 |
| 2004/0261039 | A1 * | 12/2004 | Pagan | 715/797 |
| 2005/0022139 | A1 * | 1/2005 | Gettman et al. | 715/850 |
| 2005/0086612 | A1 * | 4/2005 | Gettman et al. | 715/848 |
| 2005/0091597 | A1 | 4/2005 | Ackley | |
| 2005/0125742 | A1 * | 6/2005 | Grotjohn et al. | 715/799 |
| 2005/0132299 | A1 | 6/2005 | Jones et al. | |
| 2005/0188326 | A1 * | 8/2005 | Ikeda | 715/788 |
| 2005/0204306 | A1 * | 9/2005 | Kawahara et al. | 715/782 |
| 2005/0210388 | A1 | 9/2005 | Matsumoto | |
| 2005/0210410 | A1 | 9/2005 | Ohwa | |
| 2005/0210416 | A1 * | 9/2005 | MacLaurin et al. | 715/851 |
| 2005/0223334 | A1 * | 10/2005 | Guido et al. | 715/794 |
| 2005/0235209 | A1 | 10/2005 | Morita et al. | |
| 2005/0278650 | A1 * | 12/2005 | Sims et al. | 715/778 |
| 2005/0278654 | A1 * | 12/2005 | Sims | 715/790 |
| 2005/0289482 | A1 * | 12/2005 | Anthony et al. | 715/851 |
| 2006/0041846 | A1 * | 2/2006 | Masselle et al. | 715/793 |
| 2006/0107229 | A1 * | 5/2006 | Matthews et al. | 715/782 |
| 2006/0123353 | A1 * | 6/2006 | Matthews et al. | 715/779 |
| 2006/0161861 | A1 * | 7/2006 | Holecek et al. | 715/782 |

OTHER PUBLICATIONS

"Project Looking Glass" Sun Microsystems, Nov. 8, 2004, 9 pages, http://wwws.sun.com/software/looking_glass/.

"Exposé—Find the window you need. Now." Apple-Mac OS X—Features—Exposé, Nov. 2, 2004, 2 pages, http://www.apple.com/macosx/features/expose/.

"Microsoft PowerToys for Windows XP," Features described as "All-Tab Replacement," date unknown, printed from website, http://www.microsoft.com/windowsxp/downloads/powertoys/xppowertoys.mspx.

IronBytes, AltSwitch, Oct. 2004, Webarchive: http://web.archive.org/web/20041014013718/www.ironbytes.com/index.html.

Shareup, AltSwitchReview, Sep. 2004, http://www.shareup.com/AltSwitch-download-21278.html.

SoftSea, AltSwitchReview, Oct. 2004, http://www.softsea.com/review/AltSwitch.html.

"Mozilla," printed from Internet on Aug. 12, 2009, http://www.mozilla.org/products/firefox/tabbed-browsing.html, 3 pages.

"Opera Software," printed from Internet on Aug. 12, 2009, http://www.opera.com/features/index.dml, 8 pages.

"Safari, The fastest browser on the Mac—the best browser on any platform.", printed from Internet on Aug. 12, 2009, http://www.apple.com/safari/, 3 pages.

Shneiderman, Ben, "Treemaps for space-constrained visualization of hierarchies," Dec. 26, 1998, (updated May 18, 2004), 10 pages, printed from the internet on Aug. 12, 2009, http://www.cs.umd.edu/hcil/treemap-history/.

TDB-ACC-No: NA 930219—Disclosure Tile: Left-Shift and Right-Shift Buttons for a Standard Window.

Final Office Action for U.S. Appl. No. 11/036,610. Mail Date Jun. 13, 2008.

Final Office Action for U.S. Appl. No. 11/036,614. Mail Date Feb. 26, 2008.

Final Office Action for U.S. Appl. No. 11/036,615. Mail Date Aug. 19, 2008.

Non-Final Office Action for U.S. Appl. No. 11/036,612. Mail Date Jun. 24, 2009.

Advisory Action mailed Jun. 9, 2008 re U.S. Appl. No. 11/036,614.

Advisory Action mailed Sep. 23, 2008 re U.S. Appl. No. 11/036,612.

Final Office Action mailed Feb. 7, 2007 re U.S. Appl. No. 11/036,610.

Final Office Action mailed Jul. 10, 2008 re U.S. Appl. No. 11/036,612.

Microsoft Research, "The Task Gallery," Jul. 28, 2005, 3 pgs, web contact dcr@microsoft.com.

Microsoft Windows XP 2002, Microsoft Corp. Professional Version 2002, screen shots 1-5—from OA of Jun. 24, 2009.

"Mozilla," printed from Internet on Nov. 4, 2004, http://www.mozila.org/products/firefox/tabbed-browsing.html, 3 pages.

Non-final Office Action mailed Aug. 24, 2006 re U.S. Appl. No. 11/036,610.
Non-Final Office Action mailed Jul. 24, 2007 re U.S. Appl. No. 11/036,614.
Non-Final Office Action mailed Nov. 1, 2007 re U.S. Appl. 11/036,610.
Non-Final Office Action mailed Dec. 11, 2007 re U.S. Appl. No. 11/036,612.
Non-Final Office Action mailed Dec. 5, 2008 re U.S. Appl. No. 11/036,612.
Notice of Allowance mailed Jul. 9, 2008 re U.S. Appl. No. 11/036,614.
Notice of Allowance mailed Nov. 3, 2008 re U.S. Appl. No. 11/036,610.
Notice of Allowance mailed Jan. 7, 2010 re U.S. Appl. No. 11/036,612.
"New release WinPLOSION V.2", printed from Internet on Nov. 2, 2004.
Notice of Allowance mailed Mar. 3, 2009 re U.S. Appl. No. 11/036,615.
Notice of Allowance mailed Aug. 25, 2008 re U.S. Appl. No. 11/036,610.
Office Action mailed Jun. 24, 2009 re U.S. Appl. No. 11/036,612.
Project Looking Glass Sun Microsystems, Nov. 8, 2004, 9 pages, http://wwws.sun.com/software/looking_glass/.
"Safari, The fastest browser on the Mac—the best browser on any platform.", printed from Internet on Nov. 4, 2004, http://www.apple.com/safari/, 3 pages.
SoftSea, AltSwitchReview, Oct. 2004 (http://www.softsea.com/review/AltSwitch.html).
T-J Fan, "Left-Shift and Right Shift Buttons for Standard Windows," Jun. 1993, 4 pgs, vol. 36, Publication No. 6A, IBM Technical Disclosure Bulletin.
WinGlance, Jul. 2004, http://winglance.usablelabs-com.qarchive.org/.
Notice of Allowance in U.S. Appl. No. 11/036,612 mailed Apr. 15, 2010.
Office Action in U.S. Appl. No. 11/036,610 mailed Aug. 24, 2006.
Notice of Allowance in U.S. Appl. No. 11/036,610 mailed Nov. 3, 2008.

* cited by examiner

SYSTEM AND METHOD FOR VISUALLY BROWSING OF OPEN WINDOWS

FIELD OF THE INVENTION

Aspects of the present invention are directed generally to window arrangements in an operating system. More particularly, aspects of the present invention are directed to a method and system for configuring the open windows in a user interface that will allow a user to readily browse multiple windows.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper.

When multiple windows are open at the same time, switching quickly to the desired window can be difficult. For example, the desired window may be partially or fully occluded by other open windows. Also, the desired window may be minimized or hidden.

Window selection interfaces have been proposed to minimize the necessity to sort through the various open windows. Current versions of the Windows brand operating system by Microsoft Corporation include the Alt-Tab key combination, Task List and Taskbar, which when selected presents a list of open windows in a representation different from the primary window. Similar user interfaces exist in MAC OS X brand operating system by Apple Computing, Inc. of Cupertino, Calif. including Apple-Tab and the Dock in which a list of windows in are provided in a representation different from the primary window. Each of the aforementioned user interfaces restate or reformulate the open windows into a type of list. These interfaces however, do not allow the user to view content of a window without the window being selected.

Recently, Apple Computing, Inc. introduced Exposé in the MAC OS X brand operating system. Exposé provides a user with the ability to display all open windows as thumbnails on the desktop. In operation, when the user types the F9 key, Exposé tiles all the open windows. Namely, Exposé scales the windows down to a size such that all the open windows are displayed in a non-overlapping form. In another aspect, Exposé provides a user with the ability to display view all open windows in a particular application in a non-overlapping manner. Specifically, when the user types the F10 key, Exposé tiles all of the open windows for the current application in a non-overlapping form while fading to a gray all of the open windows associated with other applications.

While Exposé allows the user to view open windows simultaneously, multiple windows are tiled on the screen, which can still lead to some confusion. It would be helpful to provide an interface which allows a user to scan quickly through open windows, one at a time.

SUMMARY OF THE INVENTION

There is therefore a need for a method to allow users to quickly scan through open windows one at a time. According to one aspect of the invention, open windows can be presented in a visual stack representing a Z-ordering of the windows. In response, to a browse command, windows can be navigated through where each input causes the window at the top of the visual stack to move to the bottom of the stack and the remaining windows to move up in the stack with the window previously second in the visual stack being in focus. Successive browse commands causes this behavior to repeat allowing a user to cycle through each of the open windows.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
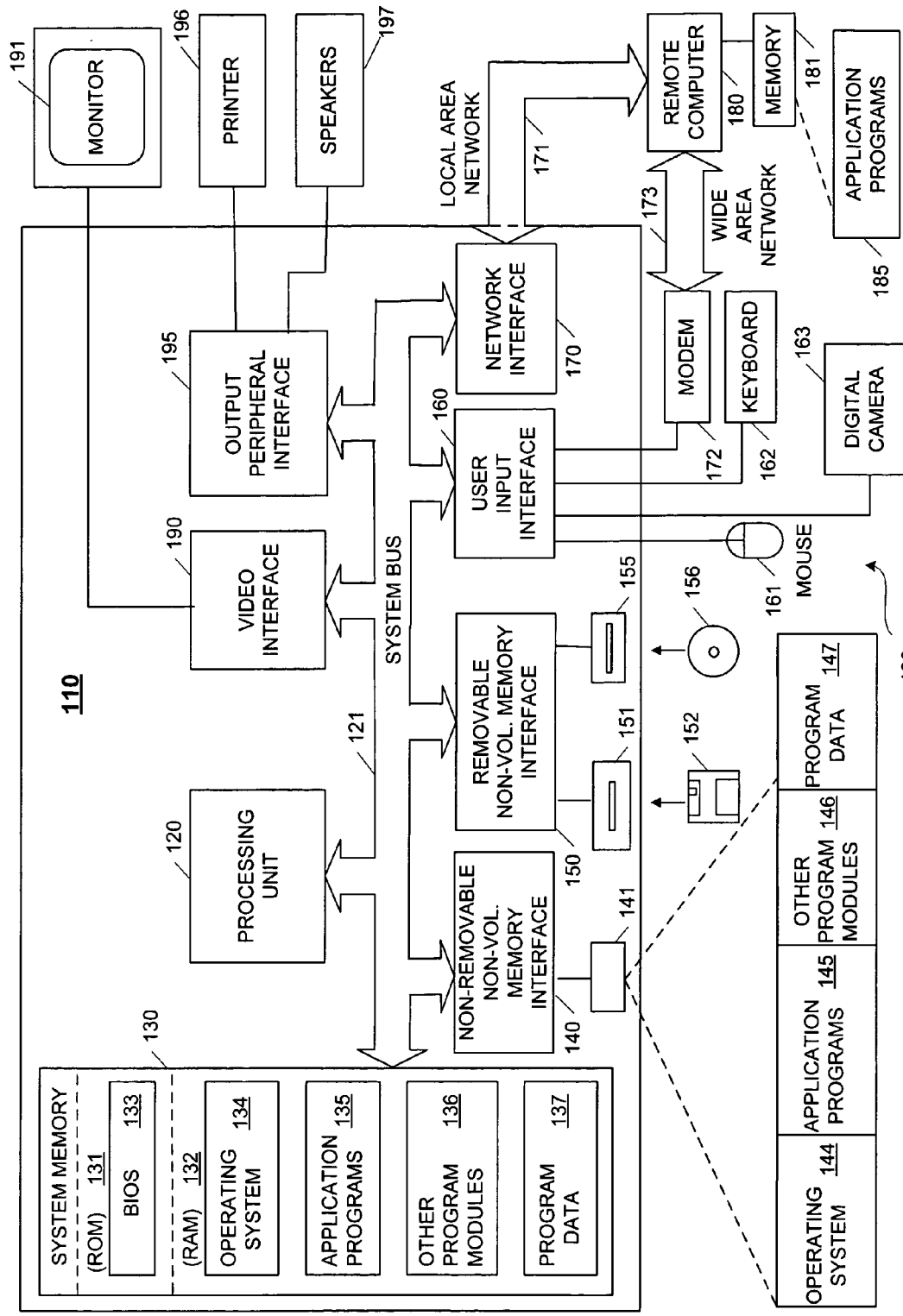
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
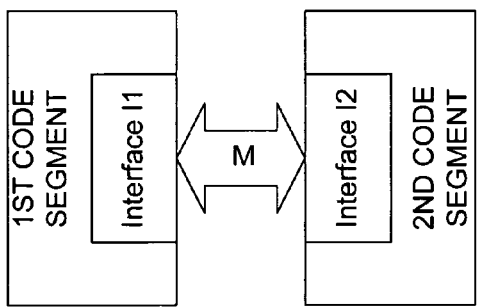
FIGS. 1B through 1M show a general-purpose computer environment supporting one or more aspects of the present invention.
Figure 1E:
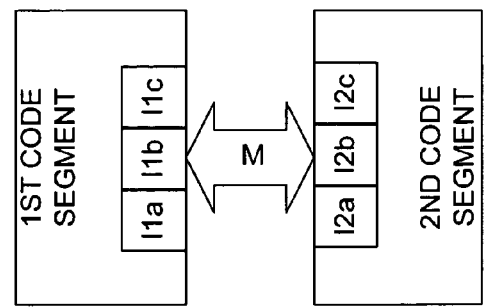
Figure 1B:
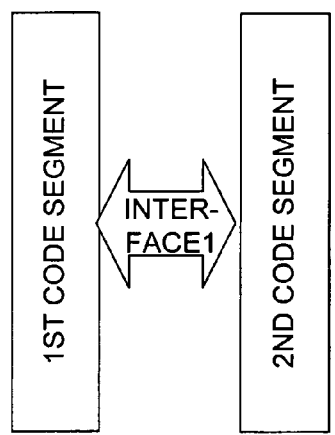

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
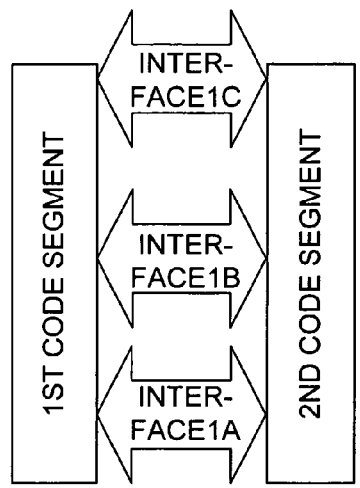

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
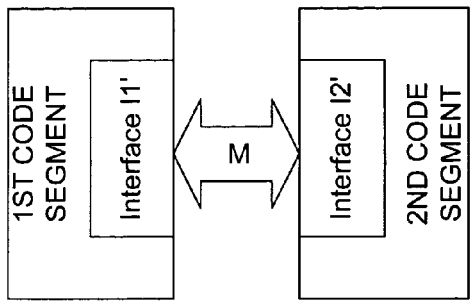
Figure 1G:
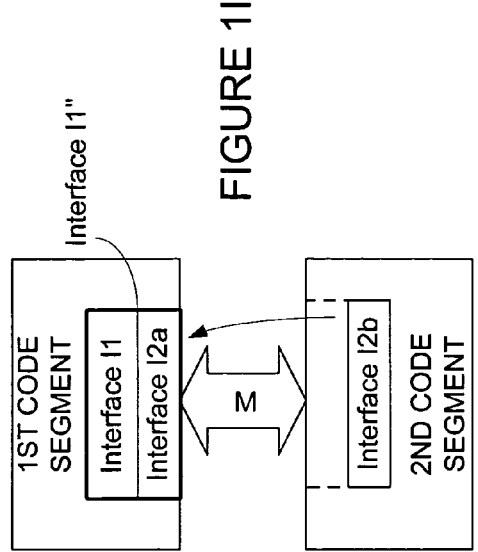

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
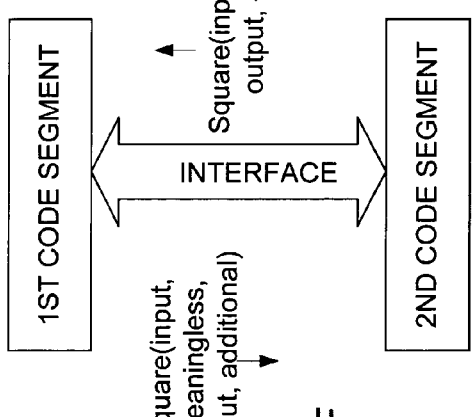
Figure 1I:
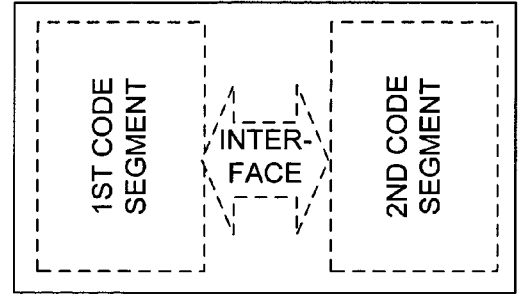

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
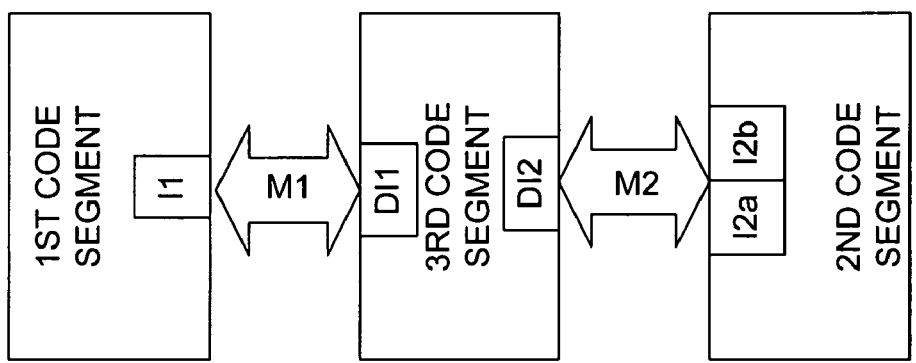
Figure 1J:
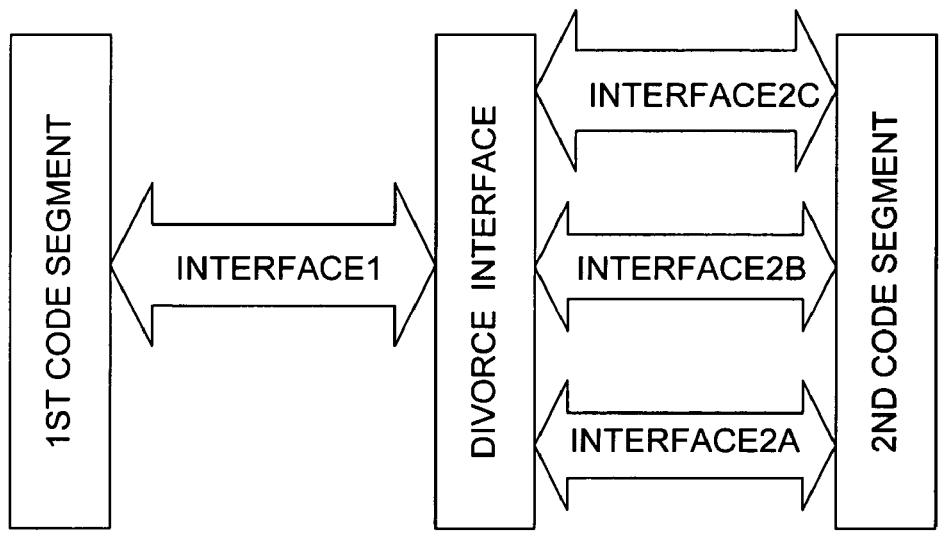

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
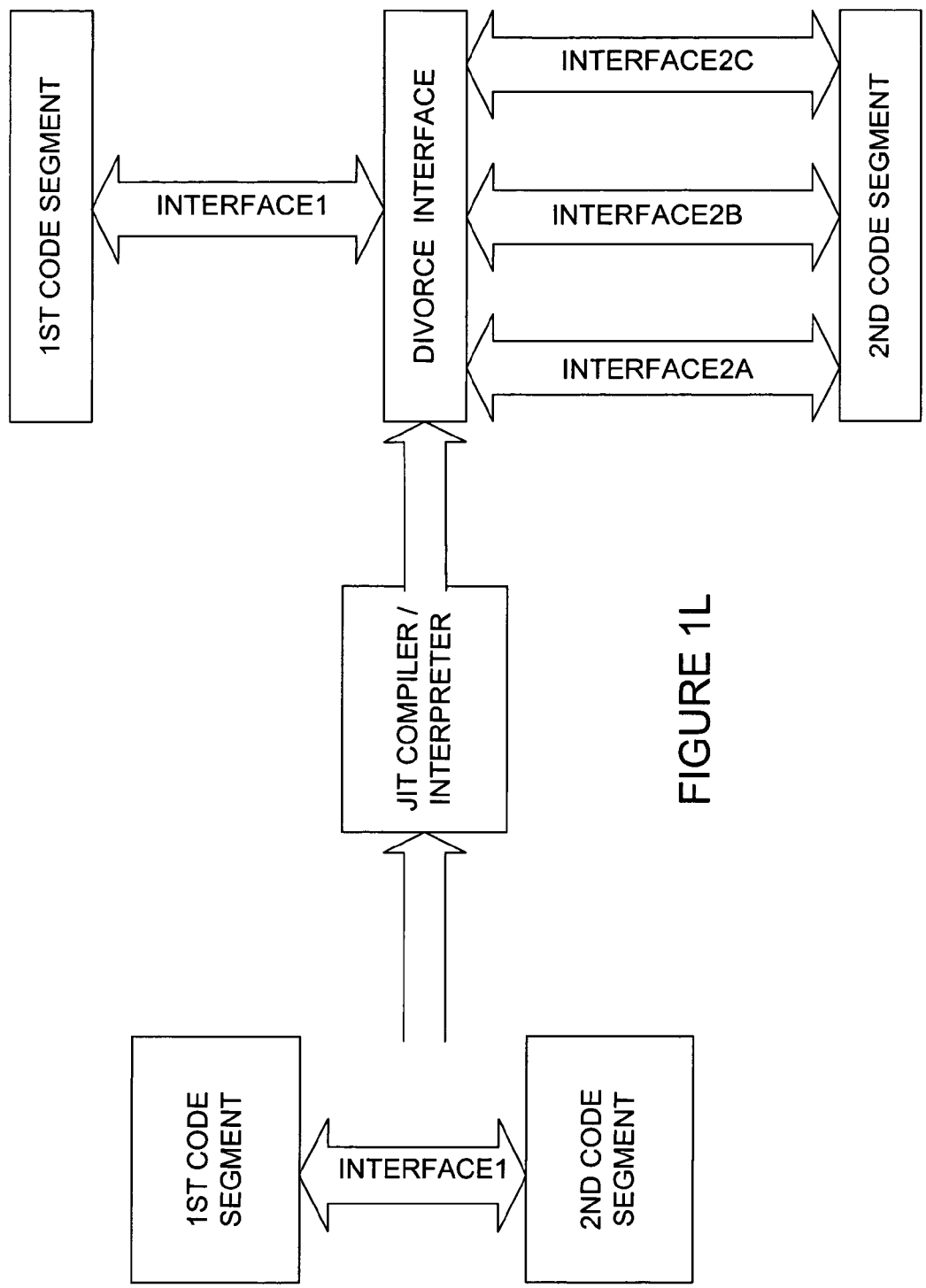
Figure 1M:
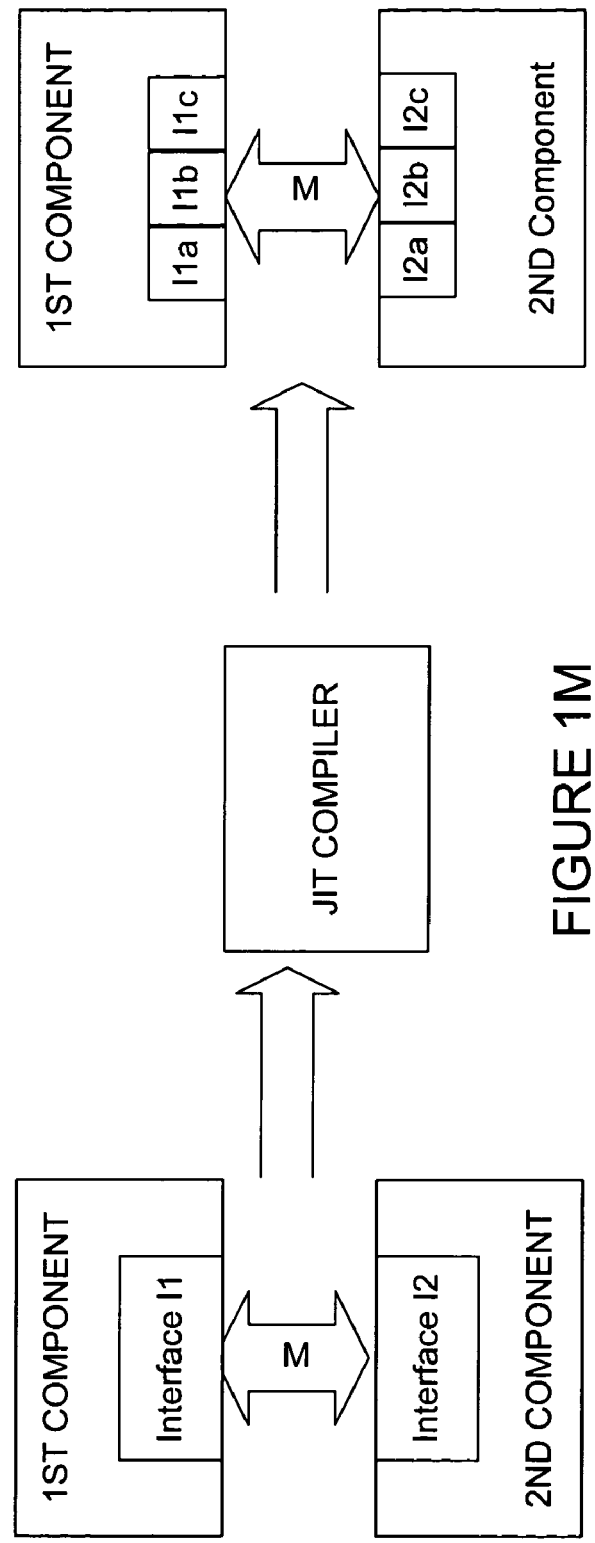

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
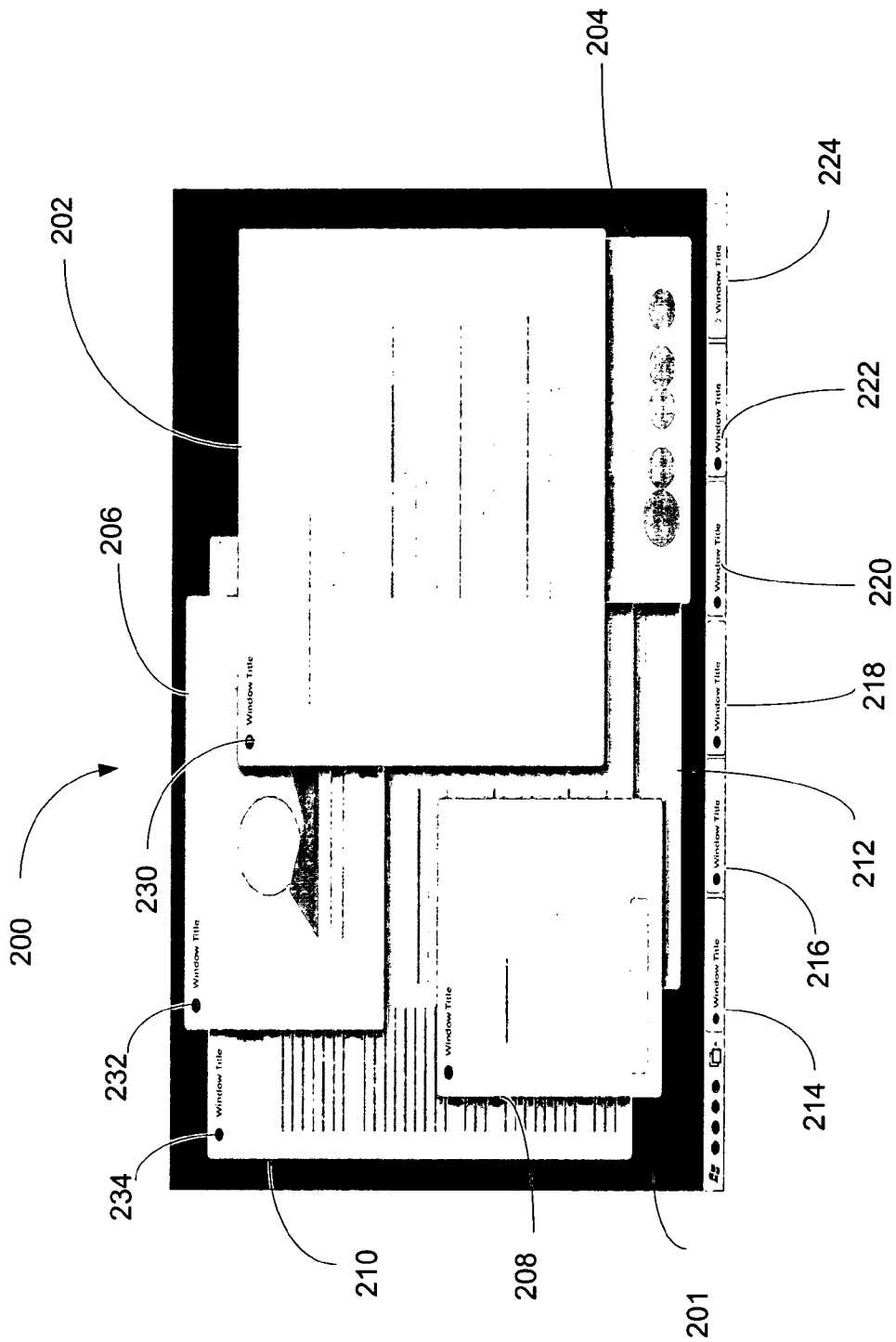
FIGS. 2A-2C illustrate a sequence of display screens to describe visual window browsing in accordance with at least one aspect of the present invention.

FIG. 2A illustrates a display screen 200 with multiple open windows overlapping each other. Various windows 202, 204, 206, 208, 210 and 212 are shown in a Z-order orientation. It should be understood by those skilled in the art that the Z-order of an orientation of windows is very well known in the art. In FIG. 2A, window 202 is higher in the Z-order than windows 204, 206, 208, 210 and 212. Window 204 is higher in the Z-order than windows 206, 208, 210 and 212. Window 208 is higher in the Z-order than windows 208, 210 and 212. Window 208 is higher in the Z-order than windows 210 and 212, and window 210 is higher in the Z-order than window 212. Window 212 is at the bottom of the Z-order in this example. As used herein, the term "orientation" is defined herein to include adjustments to the visual appearance of a window or group of windows, such as the size or shape of the window and a shared common border between or around at least two windows.

Desktop space 201 is an area of a display that allows for the display of windows corresponding to application programs. The taskbar at the bottom indicates which windows are currently in use, which may be visible or minimized. A taskbar is a specific implementation of an on-screen window remote control used to list and enable manipulation of windows, such as activating, moving, hiding, and minimizing. Window 202 may be represented by taskbar button 214. Window 204 may be represented by taskbar button 216. Window 206 may be represented by taskbar button 218. Window 208 may be represented by taskbar button 220. Window 210 may be represented by taskbar button 222. Window 212 may be represented by taskbar button 224. As shown in this example, all six of the windows are shown open. Although only six windows are shown, it should be understood that more or fewer windows may be open. The taskbar button order may indicate the order in which the corresponding windows were first opened. For example, window 206 is the third window from the top of the Z-order as shown by its corresponding taskbar button 218, while window 212 was the least recent window opened in comparison to the other five windows.

Each of windows 202, 204, 206, 208, 210 and 212 includes an indicium, respectively, corresponding to the application program using the window. Each window in FIG. 2A is shown to include an indicium. For example, windows 202, 206 and 210 respectively include indicium 230, 232, 234. It should be understood by those skilled in the art that any particular window may or may not include a corresponding indicium.

For the windows 202, 204, 206, 208, 210 and 212 shown in FIG. 2A, it is difficult to easily determine the different windows that are open and where any particular window is in the Z-order. In some orientations, one or more windows may completely obscure an underlying window in the Z-order. In such a case, a user will not be able to see the underlying window. The contents of other windows may be partially obscured by other windows higher in the Z-order. Further, in some cases, the taskbar area may be hidden when not in use. As such, a user would not even be able to quickly see the buttons without activating the taskbar area.

Figure 2B:
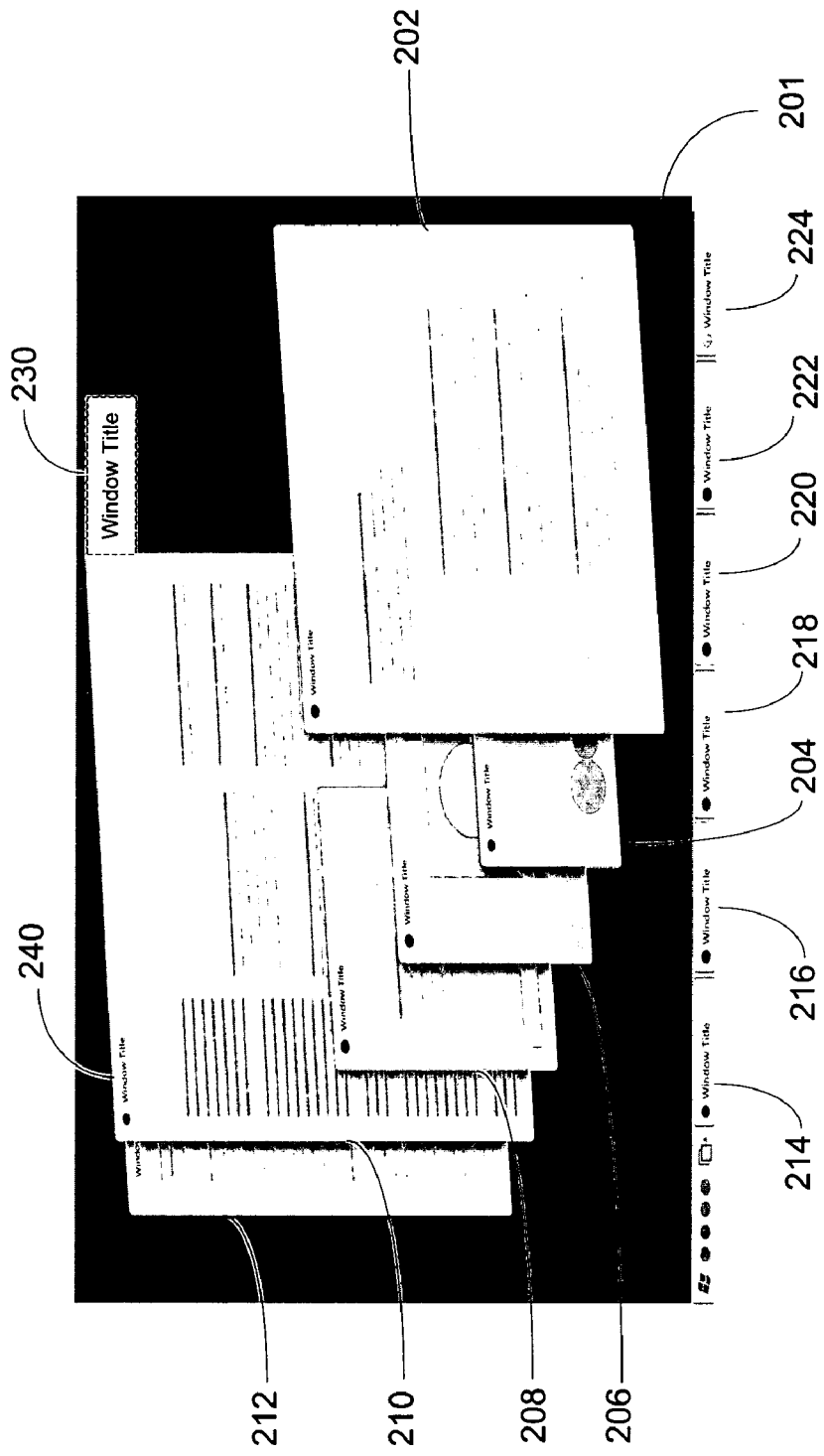

To initiate visual window browsing according to an illustrative embodiment of the present invention, the user inputs a command in the form of a keyboard shortcut, a mouse action, a voice input or the like. These inputs might include a shortcut sequence like Windows-Tab, Alt-Tab or pushing the mouse pointer to a corner of the screen. In response, to the command, each of the windows in FIG. 2A animate from their starting location and move to a position in a visual stack such as shown in FIG. 2B. A visual stack intuitively provides the user with an ordering of windows so that the open windows can be browsed or navigated through intelligently. As can be gleaned from FIG. 2B, the windows in the visual stack substantially retain their size from the FIG. 2A configuration, but are slightly scaled and skewed to provide a high fidelity three dimensional visual representation.

FIG. 2B shows an illustrative visual stack where six windows are visually presented in an isometric perspective, where the bottom left corners of the windows are aligned along a common axis or common edge of a cube. Such a visual stack configuration is akin to the appearance of a rolodex. One skilled in the art will appreciate that numerous visual stack configurations exist which can depict the relationship of the windows in the Z-order such that the user can confidently navigate from window to window knowing which window will next be in focus following a navigation command.

Each of the windows 204, 206, 208, 210 and 212 in FIG. 2B is configured in an order in which a window not at the top of the Z-order is partially overlapped or obscured by a portion of a window higher in the Z-order than the respective window. The window 202, which is not overlapped by any other window, i.e., is at the top of the Z-order, becomes the window in focus. In the FIG. 2B example, when visual browsing is initiated, the window 202, which was at the top of the Z-order in FIG. 2A, becomes in focus. It will be understood that responsive to the command to initiate visual window browsing, the window at the top of the Z-order in FIG. 2A does not necessarily become the window in focus in FIG. 2B. Stated differently, it will be appreciated that responsive to the command to initiate visual window browsing, the Z-ordering of the windows can be based on a number of known characteristics. For example, the ordering may be based on 1) the order in which the windows were last in focus from most recent to least recent, 2) distance from an edge or corner of the screen; 3) alphabetical order by title of the window or by application and title; or 4) window size smallest to largest. Ordering by window size can be particularly beneficial in that it would allow many windows to be ordered where the user would be able to discern some information regarding the content of many windows. A user interface may be provided in a configuration mode to allow the user to pre select the characteristic(s) by which the windows would be Z-ordered when initiating visual window browsing.

Figure 2C:
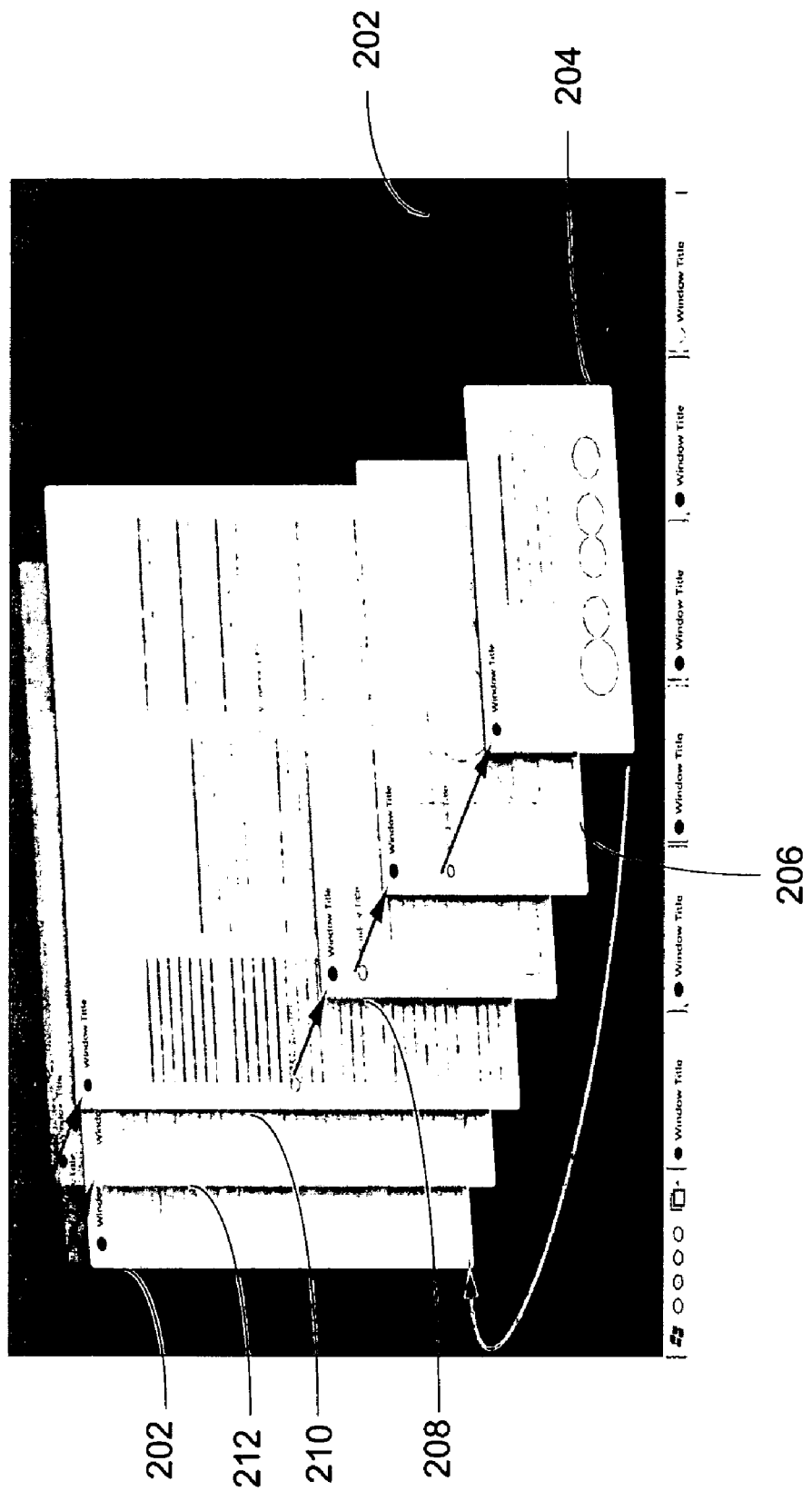

To browse to another of the windows, the user can issue another command by performing an action, such as pressing the Tab key while continuing to hold the Windows key, spinning the mouse wheel one click or providing another input. It will be appreciated that browsing to another window may be implemented in response to a further user input or it may occur automatically (e.g., in response to a passage of time such as five seconds), for example in much the same way a scan operation functions with respect to a radio. In both cases, a browsing command is generated, in one instance by a user and in another instance automatically. In response to the command, the window 202 at the top of the visual stack (Z-order) in FIG. 2B moves to the rear of the stack (bottom of the Z-order) and the remaining windows move forward as shown in FIG. 2C such that window 204 moves to the top of the stack and comes into focus. The arrows in FIG. 2C are not part of the display screen and have been provided to show the direction of the animation from moving window 202 from the top of the visual stack to the bottom of the visual stack. Non-opaque window 202A (corresponding to window 202 at the top of the Z-order) and the other non-opaque portions of the windows have also been provided to represent the animation which occurs when a user browses to another window.

Subsequent browsing commands would cause the same behavior as described with respect to FIG. 2C. Namely, the window on the top of the visual stack moves to the bottom of the visual stack and the other windows move up a position in the visual stack, with the window second in the Z-order moving to the top of the stack and coming into focus. Following the above sequence of events, the user ends their visual browsing by taking an action such as letting go of the Windows key, clicking the primary mouse button, or the like. Either the topmost window of the stack, or a window indicated via another fashion (such as clicking directly on it) becomes the new topmost window, and the windows animate back to the overlapping presentation of FIG. 2A, with the window in focus being moved to the top of the Z-order.

In certain illustrative implementations of browsing according to the present invention, all open windows substantially maintain their size, as well as their position in the Z-order while being browsed. While not required, maintaining these parameters as described can minimize the impact of the browsing action on the user's mental model of their workspace. As such, the user may be able to remember more easily the window size, window position, and the period in which a specific window was browsed relative to other windows to find the desired window more quickly.

In other implementations where one or more windows are maximized, when visual browsing is initiated the maximized window(s) would be scaled to allow for a visual stack configuration to be displayed. Also, when browsing is initiated the windows may be scaled so that the windows in the visual stack increase in size from topmost to bottommost window. In this implementation, the window at the top of the visual stack will always be scaled to be the smallest, the second window in the visual stack the second smallest and so on. Thus, in one implementation, when a command to browse from one window to the next window in the Z-order is executed, the window at the top of the stack moves to the bottom and its size is increased to be the largest window. Each other window in the visual stack would move up one spot in the Z-order and be reduced in size. Such an implementation will allow many windows to be visually displayed in the visual stack and provide a user with a comparable quantum of information regarding the content of each of the windows.

While the example of the invention described with respect to FIGS. 2A-2C discloses a system which uses all the open and visible windows, one skilled in the art will appreciate that minimized or hidden windows could also be represented by thumbnails or full-sized (restored) versions in the desktop space 201 and thus could be browsed to by adding them to the visual stack. That is, in response to a command, all minimized and hidden windows could be included on the display screen as thumbnails or in restored versions initially or in response to a command issued during the visual browsing. Such a command might be invoked by selecting an area of the display, entering a key input command or other types of user input. In this instance, the window would open to the appropriate size and move to the appropriate location in the visual stack.

Alternatively, a subset of the open (visible or hidden) windows could be browsed through. In one implementation, browsing could be set to occur based on all windows associated with a word processing application, or all windows with other common characteristics. In these scenarios, the windows on the desktop could be segmented into a particular group and the browsing would only be carried out among those windows in the particular group. The screen real estate could be used entirely for the browsing action or could be subdivided as needed. Thus, in certain implementations, only the windows for a certain group would be present in the visual stack.

It may be desirable to limit the number of windows which can be depicted in Z-order as the screen real estate may only allow a certain number (e.g., 8) of windows to be displayed in such a manner that the user will be able to determine some information regarding the content of each open window. If the windows displayed are limited in number, other open windows may be part of the stack, but not displayed. More specifically, if ten windows are open, the visual stack may only show the top 8 windows in the Z-order although ten windows are in the Z-order. Consequently, in response to a browsing command, the window at the top of the Z-order would move to the bottom of the Z-order and would not be displayed, all the other windows would move up a space in the Z-order with the window previously not displayed and occupying the ninth position in the Z-order moving to the eighth position in the Z-order and onto the display.

The amount the windows are skewed in response to the command to initiate visual browsing can depend on the number of windows to be presented in the visual stack. In this instance, the skew may increase based on the number of windows that are displayed in the visual stack. That is, to allow more windows to be presented in the visual stack and still allow a user to identify some information regarding the content of the window, it may be appropriate to increase the skews of the windows.

Figure 3:
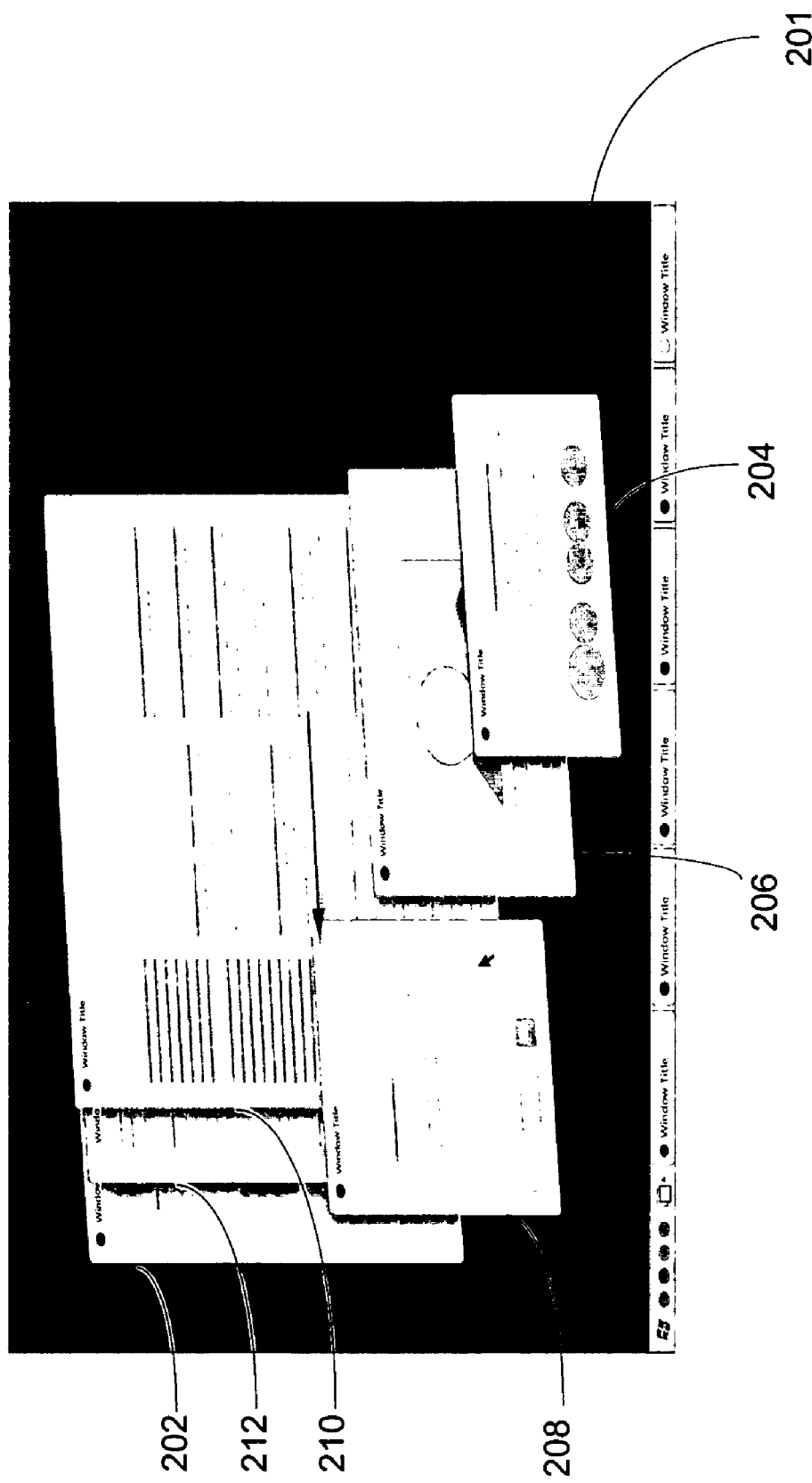
FIG. 3 illustrates a display screen showing visual window browsing in accordance with another aspect of the present invention.

In some aspects of the invention, a user can browse to a window on demand from the visual stack. Thus, to browse to the third window down in the visual stack, rather than browse to through the second window in the stack, a user can immediately browse to the third window in the visual stack by inputting a command. FIG. 3 shows such an illustrative implementation allowing random access to the windows in the visual stack. A user can input a window selection command which causes the selected window 208 to slide out or otherwise move from the visual stack to reveal more of the window so that the user can preview more of the window content as shown in FIG. 3. The arrow simply shows the direction of the animation and is not part of the display screen. A window selection command may be any type of input such as a key combination, a mouse selection of the window or a specific area of the window or the mouse pointer hovering over a portion of the window for a specific amount of time, e.g., two seconds. When selected, the window 208 in addition to moving to reveal content does not come into focus retaining the Z-order and returning to its original location in the visual stack after a preset time period and/or in response to a command. Responsive to a further system or user command, the window which has moved to reveal content may move to the top of the visual stack and into focus with the previous top window moving to the bottom of the Z-order or each of the windows above the window moving to the top moving down in the Z-order.

Figure 5:
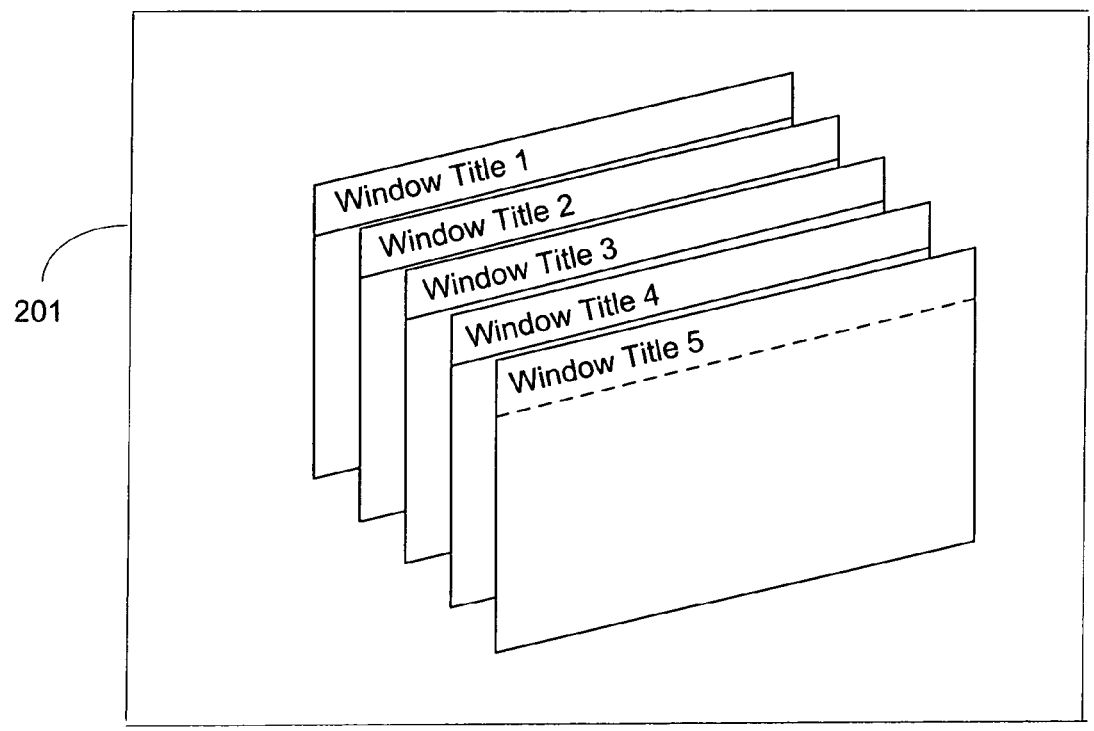
FIG. 5 is an illustrative display screen showing a configuration according to another aspect of the present invention.

In some implementations to aid a user in identifying a window, information regarding the content of the window, for example the title, could be placed in a tab, which extends from the window in the visual stack upon initiation of visual browsing or in response to a command once browsing with the title. FIG. 2B shows an exemplary tab 230. It will be appreciated that whether or not a tab is associated with the window in the visual stack could depend on how much of the window is obscured by other windows in the stack. For example, the top window in the visual stack, which is in focus, does not need a tab. In a further alternative implementation to aid a user in identifying a window, the configuration of windows could be visually stacked such that the titlebars or other primary content locations are aligned to allow a user to view these areas for each of the windows as shown in FIG. 5 for example. A titlebar corresponds to the area of window holding the title such as titlebar 240 for window 210 as shown in FIG. 2B. In still another alternative, a user could move the mouse pointer over a portion of the window so that more content is revealed in a tool tip type implementation. Also, a thumbnail could be provided when a user hovers over portion of a window to provide additional information.

Figure 4:
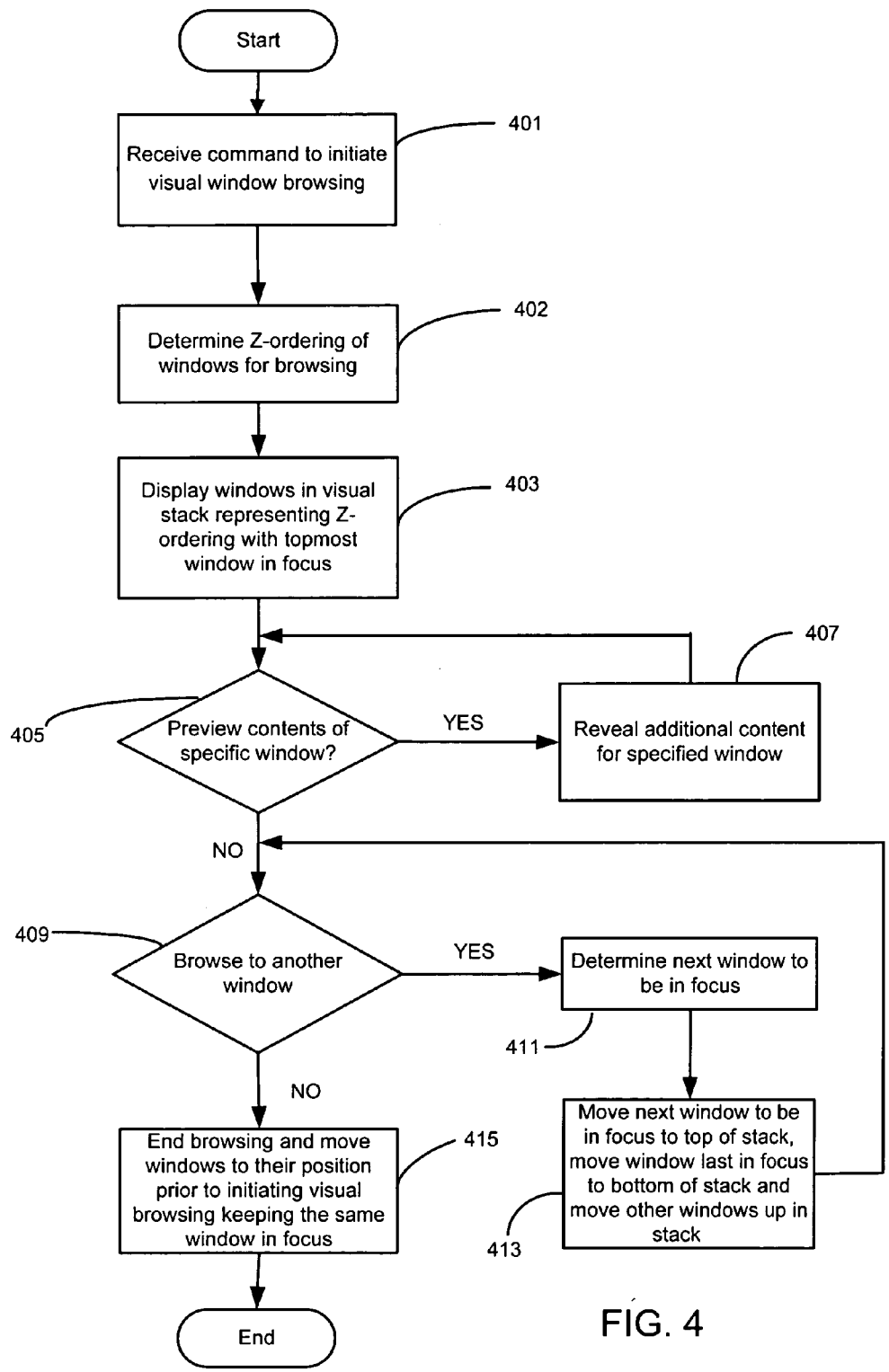
FIG. 4 is a flowchart of an illustrative example of a method for performing visual window browsing in accordance with at least one aspect of the present invention.

FIG. 4 shows a flow diagram according to at least one illustrative implementation of the present invention. With windows open on the display screen, visual window browsing can be initiated by a user inputting a command in step 401. In response, the operating system determines the Z-ordering of windows based on a predetermined ordering scheme for presenting the windows in step 402. Then, in step 403, the windows can be displayed in a visual stack representing the Z-ordering of the windows with the topmost window being in focus. In step 405, it is determined whether a user wishes to preview the contents of a specific window (e.g., is the mouse pointer hovering over a selected portion of the window). If it is determined that a preview command has been received, additional content for the specified window is revealed (e.g., as in FIG. 3) in step 407 and control returns to step 405. If no preview command has been received then it is determined whether a browse command has been received to browse to another window in step 409. If not, then in step 415 the visual window browsing has ended (e.g., responsive to a user input) and according to one aspect the windows may animate back to their presentation prior to initiating visual window browsing (FIG. 2A) keeping the same window in focus. If a browse command has been received, then it is determined in step 411 which window should be in focus next, which will normally be the next window in the visual stack unless specified by the user through a random access command such as described in connection FIG. 3. Then, the next window to be in focus is moved to the top of the stack, the last window in focus can be moved to the bottom of the stack, and other windows in the visual stack can be moved up toward the top in step 413. Thereafter, control returns to step 409.

It will be appreciated by one skilled in the art that aspects of the invention described above may be applied to any view of a collection of objects which are typically identified by their visual attributes (i.e. size, shape, position, content). For example, a collection of photographs in a folder (container) may be presented as piles (or stacks), grouped by a common attribute or explicitly by the user. Because these stacks also maintain a z-order, aspects of the invention could be used to browse the stack of photos to locate/retrieve a specific photo without having to resort to opening, or flattening, the stack.

It will be further appreciated by one skilled in the art that creating the visual stack, manipulating the visual stack, and providing the animation transitions to show the user visually what is occurring requires a 3-dimensional layout engine working with the operating system. The layout engine may be built into the operating system or it may be a standalone application, which interfaces with the operating system. One obvious aspect is that the invention needs to be performed on a system with sufficient processing power to manipulate three dimensional images in real time.

In another implementation of the present invention, various aspects of the present invention may be performed by an application programming interface (API). For example, public APIs may interface with an operating system to allow an operating system to provide the various features of the present invention. In one embodiment, a software architecture for processing data representative of a Z-ordering of overlapping windows on a computer display includes at least one component configured to move the windows to be in a visual stack in Z-order with the topmost window in the stack being in focus, and at least one application program interface to access the component. An API may receive a request to put one window in focus and other windows out of focus, access the necessary function(s) to perform the operation, and then send the results back to an operating system. The operating system may use the data provided from the API to perform the various features of the present invention.

In another implementation, a programming interface operable with an operating system, can perform the steps including intercepting an instruction to a destination module to place one window in focus and other windows out of focus, intercepting data indicating the Z-ordering of the windows, and providing an instruction to the destination module to move the windows to be in a visual stack, where the windows are visually stacked according to the Z-ordering with the one window to be placed in focus being the topmost window in the visual stack.

Illustrative aspects of the invention include providing the windows in a visual presentation configuration which can be understood by the user as having a linear or ordered arrangement, even if the windows are not strictly linear in their appearance. This allows the user to cycle quickly through the windows using input commands (e.g., keyboard or the mouse wheel) to bring a window of interest to a position where it can be viewed at near to true fidelity. Another illustrative aspect of the invention provides a three dimensional arrangement of the windows to allow the user to see as much of the most interesting part of the window (the top and left edges in left-to-right language layouts) at near 100% scaling. These two illustrative aspects together permit the user to quickly visual identify the window he is seeking using, both the contents of the window and the window shape. Another illustrative aspect resides in that transition to and from the visual presentation of the windows is carried out using animation, which helps the user understand the source of the window layout.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for concurrently displaying a plurality of windows on a display screen, the method comprising in order the steps of:

responsive to a first command, reconfiguring a plurality of windows to present a first three dimensional visual representation of the windows overlapping, wherein a first window has focus, is scaled to be smaller than the remaining plurality of windows, and is the top window of Z-order and the plurality of windows are arranged alphabetically by window title; and responsive to a second command, reconfiguring the plurality of windows to present a second three dimensional visual representation of the windows overlapping, in which a second window is located in a different position by transitioning the second window by animation from its position in the first three dimensional visual representation to its position in the second three dimensional visual representation, wherein all content of the second window is revealed while the Z-order of all the windows remains the same and the first window retains focus and the animation represents an effect of sliding out the second window from its position in the first three dimensional visual representation.

2. The method of claim 1, further comprising determining the Z-ordering of the windows prior to reconfiguring responsive to the first command.

3. The method of claim 1, wherein the Z-order is based on file name.

4. The method of claim 1, wherein the steps of reconfiguring each three dimensional visual representation includes resizing the windows presented based on the Z-ordering from smallest to largest.

5. The method of claim 1, wherein the first window is not in focus immediately prior to reconfiguring responsive to the first command and becomes in focus responsive to the first command.

6. The method of claim 1, wherein the reconfiguring responsive to the first command further includes:
determining that a number of open windows presented on the display screen when receiving the first command exceeds a threshold number; and
presenting only the threshold number of windows in the first three dimensional visual representation.

7. A computer readable storage medium, not a signal per se, having computer-executable instructions stored thereon for performing a method of concurrently displaying a plurality of windows for a plurality of applications on a display screen when executed by a computer, the method comprising the steps of:
responsive to a first command, reconfiguring a plurality of windows to present a first three dimensional visual representation of the windows overlapping, wherein a first window has focus, is scaled to be smaller than the remaining plurality of windows, and is the top window of Z-order and the plurality of windows are arranged alphabetically by window title; and
responsive to a second command, reconfiguring the plurality of windows to present a second three dimensional visual representation of the windows overlapping, in which a second window is located in a different position by transitioning the second window by animation from its position in the first three dimensional visual representation to its position in the second three dimensional visual representation, wherein all content of the second window is revealed while the Z-order of all the windows remains the same and the first window retains focus and the animation represents an effect of sliding out the second window from its position in the first three dimensional visual representation.

8. The media of claim 7, wherein the reconfiguring responsive to the first command further includes restoring a minimized or hidden window.

9. The media of claim 7, wherein the steps of reconfiguring include skewing the windows in the first and second three dimensional visual representations, wherein the amount of skew is based on the number of windows in the respective three dimensional visual representation.

10. The media of claim 7, wherein each three dimensional visual representation exposes at least title information for each window displayed.

11. A computer having a processor, memory, and display, the computer executes a display method, the method comprising the steps of:
responsive to a first command, reconfiguring a plurality of windows to present a first three dimensional visual representation of the windows overlapping, wherein a first window has focus, is scaled to be smaller than the remaining plurality of windows, and is the top window of Z-order and the plurality of windows are arranged alphabetically by window title; and
responsive to a second command, reconfiguring the plurality of windows to present a second three dimensional visual representation of the windows overlapping, in which a second window is located in a different position by transitioning the second window by animation from its position in the first three dimensional visual representation to its position in the second three dimensional visual representation, wherein all content of the second window is revealed while the Z-order of all the windows remains the same and the first window retains focus and the animation represents an effect of sliding out the second window from its position in the first three dimensional visual representation.

12. The computer of claim 11, further comprising:
responsive to a subsequent command, reconfiguring the plurality of windows to present another three dimensional visual representation of the overlapping windows, wherein a window, absent from the display screen when prior three dimensional visual representations are presented, is included.

13. The computer of claim 11, further comprising:
responsive to a subsequent command, reconfiguring the plurality of windows to present another three dimensional visual representation of the windows overlapping, wherein the plurality of windows are arranged in Z-order based on distance from an edge of the display screen.

14. The computer of claim 11, further comprising:
responsive to a subsequent command, reconfiguring the plurality of windows to present another three dimensional visual representation of the windows overlapping, in which a window is located in a different position wherein more content of the window is revealed than in a prior three dimensional visual representation while having all of the windows presented in the prior visual representation.

15. The computer of claim 11, further comprising:
responsive to a cursor hovering over a portion of another window in the second three dimensional visual representation, displays a portion of content associated with the other window, wherein the portion of content is displayed as a thumbnail.

16. The method of claim 11, further comprising
responsive to a command to preview contents of a specific window in the three-dimensional visual stack that is not the topmost window, revealing additional content of the specific window for a predetermined amount of time.

17. The method of claim 11, further comprising: determining the Z-ordering of the windows prior to reconfiguring responsive to the first command, wherein the Z-order is based on file name.

18. The method of claim 11, wherein the steps of reconfiguring each three dimensional visual representation includes resizing the windows presented based on the Z-ordering from smallest to largest.

19. The method of claim 11, wherein the first window is not in focus immediately prior to reconfiguring responsive to the first command and becomes in focus responsive to the first command.

20. The method of claim 11, wherein the reconfiguring responsive to the first command further includes:
determining that a number of open windows presented on the display screen when receiving the first command exceeds a threshold number; and
presenting only the threshold number of windows in the first three dimensional visual representation.

* * * * *